United States Patent [19]

Rieben et al.

[11] Patent Number: 4,606,001

[45] Date of Patent: Aug. 12, 1986

[54] CUSTOMIZED CANNED CYCLES FOR COMPUTER NUMERICAL CONTROL SYSTEM

[75] Inventors: Werner P. Rieben; Jill M. Willson, both of Charlottesville, Va.

[73] Assignee: General Electric Company, Charlottesville, Va.

[21] Appl. No.: 613,031

[22] Filed: May 22, 1984

[51] Int. Cl.⁴ .................... G05B 19/18; G06F 9/46
[52] U.S. Cl. .................... 364/167; 364/192; 364/474; 364/900
[58] Field of Search ............... 364/167–171, 364/188, 189, 474, 475, 191–193, 200 MS File, 900 MS File

[56] References Cited

U.S. PATENT DOCUMENTS

| | | | |
|---|---|---|---|
| 4,115,853 | 9/1978 | Dummermuth | 364/900 |
| 4,189,773 | 2/1980 | O'Meara | 364/200 X |
| 4,204,253 | 5/1980 | Van Den Hanenberg et al. | 364/200 |
| 4,410,959 | 10/1983 | Tajima et al. | 364/900 |
| 4,513,379 | 4/1985 | Wilson et al. | 364/900 X |

Primary Examiner—Joseph Ruggiero
Attorney, Agent, or Firm—Ormand R. Austin

[57] ABSTRACT

A method for defining and executing customized canned cycles for a numerically controlled machine in which the end user or original equipment manufacturer can define a sequence of actions or tasks to do precisely what a particular application warrants. The customized sequence of tasks can be subsequently edited or modified or desired. A set of executable tasks capable of being carried out by a machine are defined with an assigned number associated with each task. The desired customized sequence to be performed by a canned cycle command code is entered by the user into memory. A part program containing the command code is loaded into the computer numerical control. The command code is processed to retrieve the desired customized sequence of tasks from memory. The desired tasks are then executed in sequence to cause the commanded action in the controlled machine.

2 Claims, 3 Drawing Figures

CUSTOMIZED CANNED CYCLES FOR COMPUTER NUMERICAL CONTROL SYSTEM

BACKGROUND OF THE INVENTION

This invention relates generally to computer numerical control for industrial machines and, more particularly, to a method of defining and executing customized canned cycles in a computer numerical controlled machine.

A computer numerical control responds to part program commands to perform the desired machining operation according to the part programming information contained in the part program. The part program contains part processing information which includes: The work holding method, location of clamps, fixtures, etc., the depth of cuts, sequence of cuts and feed rates and spindle speeds for various materials. Part programs comprise one or more compatible blocks programmed in the proper order to accomplish a machining operation corresponding to a pre-planned sequence or process. Each block is a set of simultaneously executable instructions such as:

Initializing blocks which cover data inputs (dimensional system), part location (relative to machine zero position), tooling set-up (tool data and offsets), feeds and speeds (types and maximums), and safe zones (areas where the tool cannot enter or areas where the tool cannot exit).

Non-cutting blocks (dwell, reference zero cycle, and rapid traverse) and Cutting blocks (linear and circular interpolation).

Canned cycles are routines that automatically generate multiple tool movements from a single block. A canned cycle may specify the type of operation (drilling, tapping), depth of cut, feed rate and the location where the operation is to take place.

Computer numerical control manufacturers provide canned cycles since they enable the numerical control part programmer to substantially reduce the programming effort and have the further advantage of reducing the required part program memory. While the part programmer may vary the size, shape, dwell time, and number of passes in a canned cycle, the cutting motions are fixed and predefined at the time the computer numerical control is built. Each customer or user has his own special applications for the various canned cycles and would like a different set of actions corresponding to his needs. Thus, the standard canned cycle satisfied very few customers completely. The term customer or user as used herein is intended to include the original equipment manufacturer (OEM) who purchases a computer numerical control to integrate together with his machine such as a machine tool, as well as the end user, the person who purchases the system from the OEM.

It is an object of the present invention to provide canned cycles for computer numerical control which can be customized by an OEM.

It is a further object of the present invention to provide a computer numerical control with canned cycles which can be repeatedly changed to comprise different combinations of a large number of possible tasks by an end user.

SUMMARY OF THE INVENTION

In one aspect of the present invention a method for defining and executing customized canned cycles in a computer numerical control machine is provided. A set of executable tasks capable of being carried out by a machine are defined with an assigned number for each task. The desired customized sequence of tasks to be performed by a canned cycle command code is entered into memory. A part program having a canned cycle command code corresponding to the customized sequence entered into memory is then loaded into the computer numerical control. The canned cycle command code is next processed to retrieve the desired customized sequence of tasks from memory. The desired tasks are executed in sequence to cause a desired action in the controlled machine.

BRIEF DESCRIPTION OF THE DRAWING

While the specification concludes with claims particularly pointing out and distinctly claiming the present invention, the objects and advantages of the invention can be more readily ascertained from the following description of a preferred embodiment when used in conjunction with the accompanying drawing in which:

DETAILED DESCRIPTION OF THE INVENTION

Figure 1:
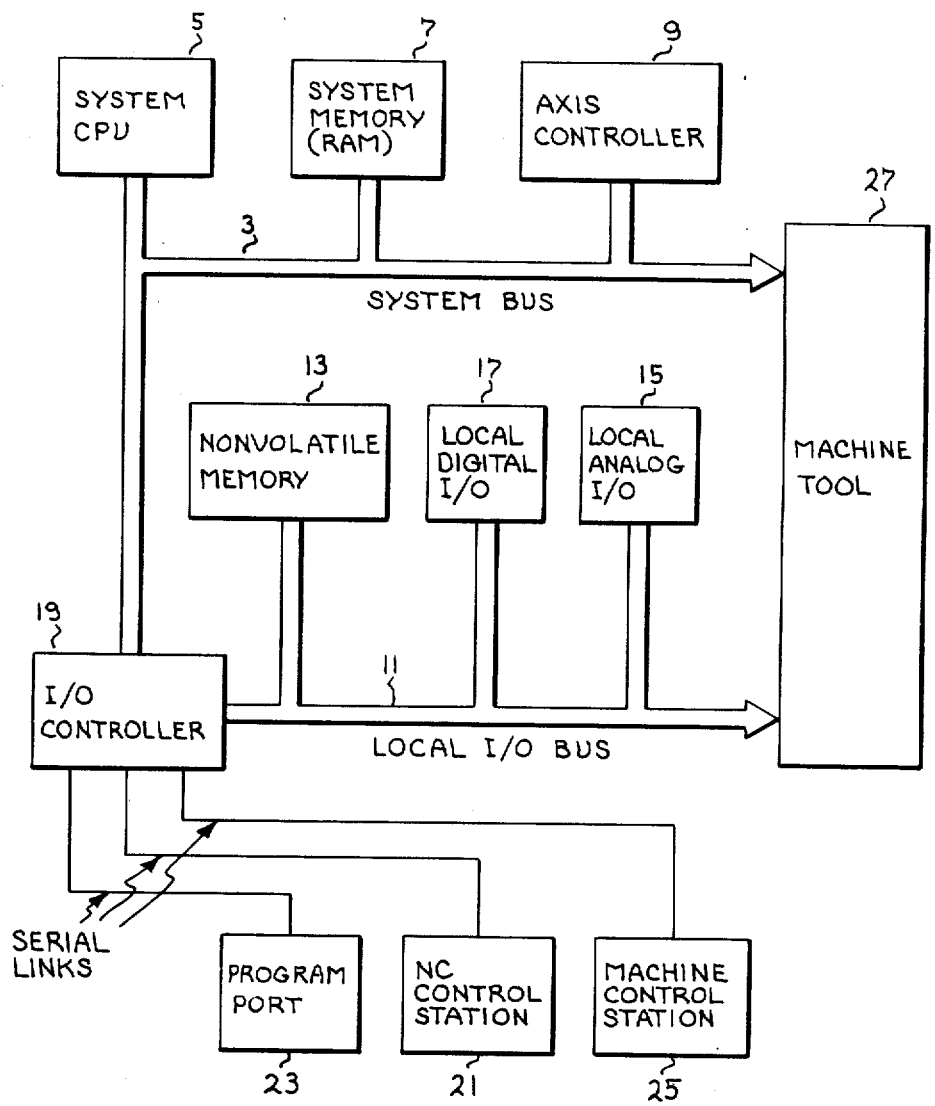
FIG. 1 is a simplified, functional block diagram of a computer numerical control system.

Referring now to the drawing and particularly FIG. 1 thereof, there is shown a general purpose machine tool control system comprising a system bus 3 coupling a system central processing unit (CPU) 5, system memory 7, and axis controller 9. A local Input/Output (I/O) bus 11 couples non-volatile memory 13, such as magnetic bubble memory, local analog I/O 15, and local digital I/O 17. I/O controller 19 is coupled to the system bus 3 and local I/O bus 11. Coupled to the I/O controller by serial links are an NC control station 21 containing a keyboard and CRT, a program port 23 for coupling a tape reader, for example, and a machine control station 25 which is the machine tool operator's control panel. The system bus 3 and local I/O bus 11 are coupled to a machine tool 27.

The system CPU 5 performs processing for the execution of part programs and monitors and controls the interlocking and sequencing of machine tool operations. The system CPU can comprise Intel 8086 and 8087 microprocessors. The system memory 7 comprises random access memory.

I/O controller 19 manages system I/O bus 3 operation and serves to connect the system bus to the local I/O bus 11. I/O controller 19 comprises universal asynchronous receiver transmitter and a microprocessor. I/O controller 19 also functions as a direct memory access arbitor for the system memory.

At power-up, the system software contained in the bubble memory 13 is down-loaded from the bubble memory into the system memory 7. A part program can be input from an external device (for example, a paper tape or cassette reader) via the program port 23, or the ASCII keyboard of the N.C. Control Station 21. The part program is stored by the I/O controller 19 in non-volatile memory 13. The part program is transferred into system memory. The computer numerical control operates under the control of the system CPU 5 executing programs which reside in the system memory. The system CPU directs the execution of part programs through the axis controller 9 and the analog and digital I/O controllers 15 and 17, respectively, which are all connected to the machine tool 27. Local digital I/O component 17 generates digitized actuator control signals and monitors the status of contact inputs. The local analog I/O component 15 enables the numerical control to control low precision servo driven devices. The axis controller 9 supplies variable dc voltage to axis feed drives contained in the machine tool to control axes and spindle movements. The axis controller is explained in further detail in copending application Ser. No. 415,507, filed Sept. 7, 1982 (now U.S. Pat. No. 4,515,814, the disclosure of which is incorporated herein by reference) and assigned to the instant assignee.

Figure 2:
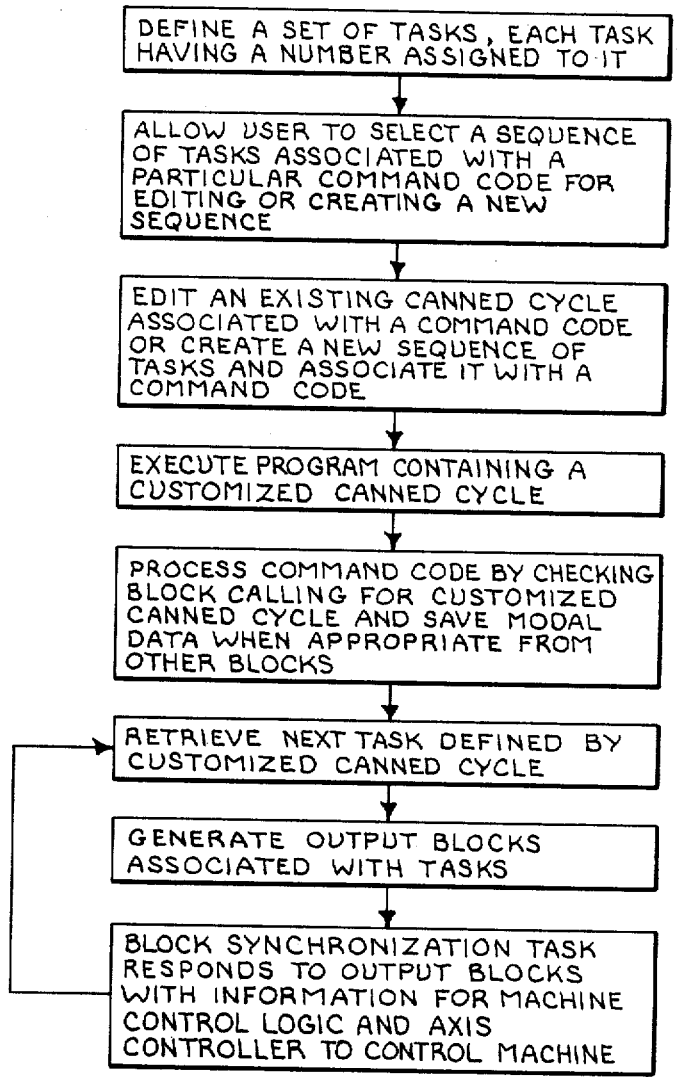
FIG. 2 is a computer flow chart for defining and using customized canned cycles in a computer numerical control system in accordance with the present invention.
Figure 3:
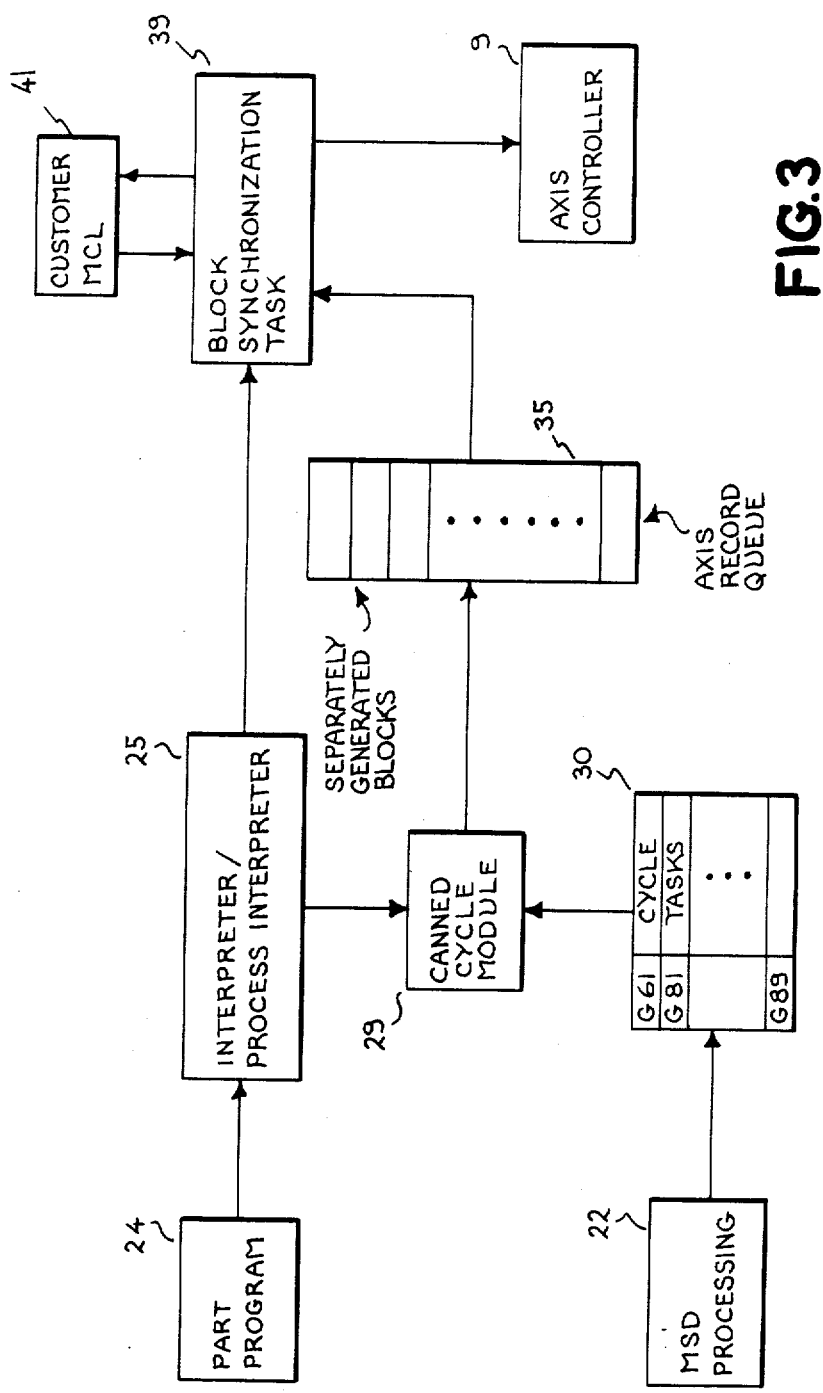
FIG. 3 is a data flow representation of a computer numerical control system in accordance with the present invention.

Referring now to FIGS. 2 and 3, the computer flow chart of FIG. 2 will be explained, as appropriate, with reference to the data flow diagram of FIG. 3. A set of single tasks is first defined with each task describing one action that can be performed in the customized canned cycle. The tasks include those which are in standardized canned cycles plus additional tasks to provide customized variations. Each task is assigned a unique number to correspond to its particular action. There is one-to-one mapping of the task to the numbers. Zero corresponds to the end of the cycle state.

A list of possible tasks, their associated number and a description of their actions are.

Task 00: End of Cycle

Task 00 is used to terminate each canned cycle and is mandatory.

Task 01: Rapid to R Plane

Task 01 causes the canned cycle axis to transverse to the defined R plane. The task is completed at the in-zone position unless immediately preceded by Task 20, in which case the move is completed at distance zero position.

Task 02: Start Spindle

Task 02 initiates a start spindle sequence at programmed speed and direction.

Task 03: Stop Spindle

Task 03 initiates a stop spindle sequence.

Task 04: Orient Spindle

Task 04 initiates a spindle orient sequence. The programmer must stop the spindle before calling this task unless the OEM has made spindle stop a part of his spindle orient sequence.

Task 05: Reverse Spindle Direction

Task 05 causes the spindle direction to reverse from the programmed direction.

Task 06: Off-Center Position

Task 06 allows the programmer to move a tool tip away from the work surface after a spindle orient sequence within a canned cycle. The purpose is to prevent tool marks on the work surface during tool retract or entry movements. A prerequisite of an off-center position movement is the spindle orient task 04. The off-center position is initiated by an task 06 in the canned cycle sequence and is removed by task 07.

Task 07: Remove Off-Center Position

Task 07 is identical to task 06, except that the spindle position is returned in the opposite direction to its original center position.

Task 08: Feed to Depth

Task 08 causes the canned cycle axis to travel to the programmed depth position at the programmed feedrate. Task is completed at in-zone position unless preceded by an task 20, distance zero position.

Task 09: Incremental Feeding

Incremental feeding, also called peck drilling, is used for deep hole drilling cycles. In deep hole drilling, the drill is retracted periodically to remove the chips from the drill. With the initiation of incremental feed, a total of 7 parameters may be programmed to adapt the incremental feed cycle to the required application.

Task 10, 11, 12, 13: Timers

Four timers are provided to allow the OEM customization of the canned cycle. Timer actions may be repeated within a cycle to increase the time delay.

Task 14, 15: Return to R Plane or To Initial Position G78 (G78 is G word for (Tool Retract to Prior Tool Position)

These tasks cause the canned cycle axis to return to the R plane, or, if G78 is active, to the initial position. G words are preparatory words used in part programming to provide set up information for various types of operations.

a. Task 14: Return to traverse rate.

b. Task 15: Return at programmed feedrate.

Task 16, 17: Return to Initial Position

These actions cause the canned cycle axis to return the tool to the position it occupied when the cycle was initially defined by G word. This initial position can be changed during repetition of the cycle if a new tool axis position is programmed in a G77 (Position Don't Drill) block. Initial position as used in tasks 16 and 17 is the same as the initial position used when G78 is programmed.

a. Task 16: Return at traverse rate.

b. Task 17: Return at programmed feedrate. Both actions complete at in-zone position.

Task 18: Programmed Spindle Direction

Task 18 causes the spindle to run in the programmed spindle direction.

Task 19: Turn on Operator's Feedhold

Task 19 causes the Machine Control Logic (MCL) to turn on the operator's feedhold. Machine Control Logic consists of a series of programs that allow an OEM to interface the computer numerical control to any type of machine tool. The MCL provides functions unique to a particular machine tool such as tool turret control, tool changes control, coolant control, gauging equipment and parts handlers. The operator's Feedhold pushbutton is illuminated, and all axis motion is stopped to allow the operator to remove chips, inspect the part, etc. The canned cycle will continue at the next step in the cycle when the operator, or the MCL, turns off the operator's feedhold.

Task 20: Distance Zero Move

Most canned cycle axis moves are completed when the axis reaches the in-zone position. Any canned cycle axis move (tasks 06, 07, 08, 14, 15, 16, 17) may be completed at the distance zero position if the move is immediately preceded by task 20. Task 20 applies only to the following task which causes an axis movement.

Task 21: Force 100% Manual Feedrate Override (MFO)

MFO is normally active for all canned cycle moves except G84. Any canned cycle axis move may be forced to 100% MFO if the move is preceded by task 21. Task 21 applies only to the next action causing an axis movement, then reverts to its previous condition.

Task 22: Initiate Appropriate Sequence in Machine Control Logic (MCL)

This is a command to the MCL to perform a special task that is appropriate at this step in the canned cycle. One or more task 22 steps may be used in a canned cycle sequence. Each time task 22 is encountered, the current step number is made available to the MCL for appropriate action. Typical use of this function might be to set clamps, turn on/off air or coolant, or initiate other machine functions.

Task 23: Force 100% Spindle Speed Override

This task initiates 100% Spindle Speed Override. Condition remains until cancelled by task 24.

Task 24: Stop 100% SSO

Task 24 cancels 100% SSO and returns spindle SSO to previous condition.

Task 25: Disable Feedhold

Task 25 disables all feedholds, whether operator or MCL initiated. Condition remains until cancelled by task 26. Any feedhold signal received while task 25 is active will be "remembered" and initiated when feedhold is enabled by task 26.

Task 26: Enable Feedhold

Task 26 cancels Disable Feedhold (task 25).

Task 27: Force 100% SSO Until Cycle Is Cancelled

Task 27 initiates 100% spindle speed override which remains active until the current canned cycle is cancelled.

Task 28: Programmable Dwell

Task 28 will insert a dwell in a cycle when parameter P3 is programmed. This action may not be programmed in the same cycle with task 09.

It is easy for the control manufacturer to add new tasks to the possible tasks listed above.

The next step is for the original equipment manufacturer (OEM) or end user to select a sequence of tasks associated with a particular command code for editing or creating a new program. In the present embodiment a maximum of 24 steps may be used to define a canned cycle and the machine manufacturer provides ten canned cycles with defined sequences which the OEM can choose to customize by using a support file editor after transferring the contents of the bubble memory to a host or direct numerical control (DNC) computer. An example of ten canned cycles supplied with the computer numerical control are as follows:

| G61 | Through plate drilling cycle |
| G81 | Drilling cycle |
| G82 | Drilling cycle with dwell |
| G83 | Deep hole drilling cycle |
| G84 | Tapping cycle |
| G85 | Boring cycle with dwell, feedrate return |
| G86 | Boring cycle with spindle stop, traverse return |
| G87 | Case boring cycle |
| G88 | Bore with dwell, spindle orient, traverse return |
| G89 | Reversed facing cycle (back boring) |
| G80 | Cancel G60/G80 cycles |

| Command Code | Step 1 2 3 4 5 6 7 8 9 10 11 12 13 14 15 16 17 |
|---|---|
| G61 | 01 20 08 14 00 |
| G81 | 01 08 14 00 |
| G82 | 01 08 10 14 00 |
| G83 | 01 09 11 14 00 |
| G84 | 27 01 25 21 20 08 05 21 15 26 18 00 00 |
| G85 | 01 08 10 15 00 |
| G86 | 01 08 10 03 14 02 00 |
| G87 | 01 20 08 00 |
| G88 | 01 08 10 03 01 06 14 07 02 00 |
| G89 | 03 04 06 01 07 02 08 10 15 03 04 06 16 07 02 00 |

An end user can select a sequence of tasks associated with a particular command code by gaining access to the system memory locations where storage of defined sequences using the assigned numbers corresponding to the sequence of tasks is stored. A section of the assigned memory location is associated with each of the ten canned cycle command codes. The assigned memory locations are therefore ten arrays of tasks numbers, or a two dimensional array indexed by canned cycle command codes and the number order of the sequence of the tasks. In the present embodiment, a maximum of 24 steps may be used to define a canned cycle. The ten canned cycles are the cycles customized by the OEM or if not changed by the OEM then they're the standard canned cycles supplied by the control manufacturer.

The end user can perform step of editing by storing a customized task sequence associated with a particular command code to modify or completely change the canned cycle.

Referring to the data flow diagram in FIG. 3, the machine set up data (MSD) processing block 22, which is implemented in software, allows access to a portion of system memory allowing the end user to modify or completely change the sequence associated with a particular command code. MSD processor can store the changes made to the command code in the bubble memory so that the canned cycles will appear as customized when the control is again powered-up or cycle code called if power-up is not necessary. The end user edits the canned cycle using the MSD editor while the OEM uses a support file editor after transferring the contents of the bubble memory to a host or direct numerical control computer.

An explanation of the execution of a customized canned cycle will now be given with reference to FIGS. 2 and 3. Executing a program containing a customized canned cycle can be performed by entering a part program 24 from a part tape or from bubble memory and interpreting and processing the data strings contained in the part program in the Interpreter/Process Interpreter 25. Each block of data of the part program is checked for format errors, and other data such as parameters or information not pertaining directly to the canned cycle, such as a tool code. The checked block is then processed. If the block is a command code, it is recognized and the canned cycle module 29 is called. The canned cycle module performs the step of retrieving the first task defined by the custom canned cycle from memory 30. The canned cycle module 29 then generates output blocks into an axis record queue 35 by selecting the next task in the array and matching it with a valid task number and performs the conditions associated with each step. Most, but not all, of the cycle tasks cause data to be stored into generated axis record queue.

The block synchronization task 39 retrieves axis records from the axis record queue and sends appropriate commands to the axis controller 9 and machine control logic 41. The axis board and the MCL, in turn, respond with axis motion and MCL functions, such as coolant on, operator feedhold off, etc.

Although the method of defining and executing canned cycles is applicable with any type of computer numerical control, the implementation disclosed herein is particularly applicable for use with a Mark Century® 2000 CNC available from General Electric Company. The hardware architecture for the Mark Century 2000 CNC is shown in FIG. 1.

The foregoing describes a method for defining and using customized canned cycles in a computer numerical controlled machine where both the original equipment manufacturer and the end user can alter the canned cycles supplied by the controller manufacturer or completely redefine the canned cycles.

While the invention has been particularly shown and described with reference to one preferred embodiment thereof, it will be understood by those skilled in the art that various changes in form and detail may be made without departing from the spirit and scope of the invention.

What is claimed is:

1. A method for defining and executing canned cycles in a computer numerical controlled machine comprising the steps of:
   (a) defining a set of executable tasks cable of being carried out by a machine, with an assigned number for each task;
   (b) entering into memory the assigned numbers representing a desired customized sequence of tasks for a particular canned cycle command code;
   (c) loading a part program into the computer numerical control having a canned cycle command code corresponding to the customized sequence entered into memory;
   (d) processing the canned cycle command code to retrieve the customized sequence entered into memory; and
   (e) executing the desired tasks in sequence to cover the desired action in the controlled machine.

2. A method of defining and executing customized canned cycles in a computer numerical controlled machine comprising the steps of:
   (a) defining a set of executable tasks capable of being carried out by the machine, with an assigned number for each task;
   (b) assigning memory locations for storage of desired sequences of the defined executable tasks using the assigned numbers corresponding to the tasks;
   (c) associating a section of the assigned memory location with each of a predetermined number of canned cycle command codes;
   (d) entering into the section of the assigned memory location associated with a canned cycle command code the assigned numbers representing a desired customized sequence of tasks to be performed by that canned cycle command code;
   (e) loading a part program into the computer numerical control having a canned cycle command code corresponding to a desired customized sequence entered into the assigned memory locations;
   (f) processing the canned cycle command code to retrieve the desired customized sequence of tasks from memory; and
   (g) executing the desired tasks in sequence to cause the desired action in the controlled machine.

* * * * *